(12) United States Patent
Langelloti et al.

(10) Patent No.: US 12,053,919 B2
(45) Date of Patent: Aug. 6, 2024

(54) METHOD AND DEVICE FOR PRODUCING HELICAL COILS

(71) Applicant: Leo Feinwerktechnik GmbH & Co. KG, Dietzenbach (DE)

(72) Inventors: Franco Langelloti, Obertshausen (DE); Martin Leo, Dietzenbach (DE); Wolfgang Bachmann, Groß-Umstadt (DE); Lothar Nuss, Heusenstamm (DE)

(73) Assignee: Leo Feinwerktechnik GmbH & Co. KG, Dietzenbach (DE)

( * ) Notice: Subject to any disclaimer, the term of this patent is extended or adjusted under 35 U.S.C. 154(b) by 170 days.

(21) Appl. No.: 17/616,957

(22) PCT Filed: May 25, 2020

(86) PCT No.: PCT/EP2020/064462
§ 371 (c)(1),
(2) Date: Dec. 6, 2021

(87) PCT Pub. No.: WO2020/244955
PCT Pub. Date: Dec. 10, 2020

(65) Prior Publication Data
US 2022/0324157 A1 Oct. 13, 2022

(30) Foreign Application Priority Data

Jun. 7, 2019 (DE) .................... 10 2019 115 591.6

(51) Int. Cl.
*B29C 53/84* (2006.01)
*B29C 53/12* (2006.01)

(52) U.S. Cl.
CPC ............ *B29C 53/845* (2013.01); *B29C 53/12* (2013.01)

(58) Field of Classification Search
CPC ....... B29C 53/845; B29C 53/12; B29C 53/16; B29C 53/84; D21F 1/0072
See application file for complete search history.

(56) References Cited

U.S. PATENT DOCUMENTS 3,572,023 A * 3/1971 Galonska ................. B29D 5/06
57/1 R
2015/0287490 A1* 10/2015 Spiegelhalder ....... B29C 70/545
156/441
2016/0069484 A1* 3/2016 Jha ............................ F16L 1/14
156/149

FOREIGN PATENT DOCUMENTS

CH 421484 A 9/1966
DE 1140698 B 12/1962
(Continued)

*Primary Examiner* — Emmanuel S Luk
*Assistant Examiner* — Elisa H Vera
(74) *Attorney, Agent, or Firm* — Smartpat PLC (57) ABSTRACT

In a method for producing helical coils, in particular for coil screens, a filament is conveyed in a filament conveying direction through a first channel portion of a first rotation body, and subsequently conveyed through a second channel portion of a second rotation body which rotates synchronously with the first rotation body. The filament is subsequently wound around a protruding winding mandrel, such that a helical coil is produced from the filament by a continuous feed of the windings of the filament wound around the winding mandrel. A heated heating fluid flows with an excess pressure through the first channel portion and the second channel portion, arranged downstream, and in the process heats the filament conveyed through the first channel portion and subsequently through the second channel portion. The filament emerging from the second channel portion is deformed, using a deformation apparatus, prior to winding onto the winding mandrel.

6 Claims, 4 Drawing Sheets

(56) References Cited

FOREIGN PATENT DOCUMENTS

| | | | |
|---|---|---|---|
| DE | 1956321 | A1 | 5/1971 |
| DE | 2010268 | A1 | 9/1971 |
| DE | 2147438 | A1 | 3/1973 |
| DE | 202008005836 | U1 | 8/2008 |
| DE | 102010056254 | A1 | 6/2012 |
| EP | 0569928 | A1 * 11/1993 ............. B29C 53/84 |

\* cited by examiner

METHOD AND DEVICE FOR PRODUCING HELICAL COILS

TECHNICAL FIELD

The disclosure relates to a method for producing helical coils, in particular for coil screens.

BACKGROUND

Coil screens can be produced from a plurality of helical coils which are arranged side-by-side and interconnected, which screens are used in practice as coverings or dryer screens in paper machines. Planar compound structures consisting of a plurality of helical coils are also suitable as conveyor belts or as filter means. The individual helical coils can be produced from metal. For a plurality of fields of application, helical coils made of plastics material exhibit advantageous properties. The helical coils are typically produced from a strand or filament which is conveyed from a supply roll through a coil device comprising a rotating guide element for the filament, and is subsequently wound around a winding mandrel. With every new winding of the filament which is wound from the rotating guide element onto the winding mandrel, the windings wound before are dislodged and the resulting helical coil is pushed from the winding mandrel.

A method of this kind, as well as various variants of devices by means of which this method can be carried out, are described for example in DE 1 140 698, in CH 421 484, or in DE 1 956 321.

When producing helical coils from a plastics strand or plastics filament it is advantageous for the filament to be heated when being wound onto the winding mandrel, in order for the wound filament to retain as permanently as possible the shaping specified by the winding, even after removal from the winding mandrel. DE 2 010 268 describes a device in which the winding mandrel is heated, and as a result brief heating of the filament wound onto the winding mandrel can be brought about, which is also referred to in this document as thermosetting. Devices are known from practice in which the filament is heated soon after being unwound from the supply roll, and is conveyed in the heated state through one or more channel portions, in order to subsequently be wound onto the winding mandrel.

For many fields of use of a helical coil it is advantageous for the helically wound filament not to have a circular cross-sectional area, but rather to have an elliptical or approximately rectangular cross-sectional area. Since the filaments typically used for producing helical coils initially have a circular cross-sectional area, it is then necessary to deform the filament after unwinding from the supply roll and before winding onto the winding mandrel. This can be achieved for example in that the filament is guided through between rotatably mounted rollers, wherein the spacing of the rollers is less than an original diameter of the filament, and in that the filament is deformed to a flattened cross-sectional area. DE 20 2008 005 836 U1 describes a deformation of the filament directly before entry into the first channel portion.

In the case of this deformation of the cross-sectional area of the filament, too, it is advantageous for the filament to be heated during the deformation. It is known from practice that the filament is heated following unwinding from the supply roll, and is also deformed immediately thereafter. However, it has been found that the cross-sectional area of the filament, which is no longer rotationally symmetric following the deformation, is disadvantageous for the subsequent conveying through the rotating components until being wound onto the winding mandrel, since, during the rotation, the flat filament can tilt outside or also inside the channel portions, or can jam in the guide elements.

SUMMARY

It is an object of the present disclosure to provide a method that allows for production of a helical coil from a filament which is as quick and reliable as possible.

The method for producing helical coils, in particular for coil screens, includes conveying a filament in a filament conveying direction through a first channel portion of a first rotation body. A first rotation body rotates about a first portion of a core element which is mounted in a non-rotatable manner. The filament is subsequently conveyed, in the filament conveying direction, through a second channel portion of a second rotation body which rotates about a second portion of the core element, downstream of the first portion, synchronously with the first rotation body. The filament is subsequently wound around a winding mandrel which protrudes out of the core element after the second portion in the filament conveying direction, such that a helical coil can be produced from the filament by a continuous feed of the windings of the filament wound around the winding mandrel.

A heated heating fluid flows with an excess pressure through the first channel portion and the second channel portion, arranged downstream, and in the process heats the filament conveyed through the first channel portion and subsequently through the second channel portion. The heating of the filament is thus not restricted to a conveying portion before or after the rotating channel portions, but rather takes place during conveying of the filament through the rotating channel portions. As a result, heating can be brought about which is substantially more efficient and more gentle for the filament, and it is simultaneously possible to achieve a comparatively high level of heating of the filament during winding onto the winding mandrel.

Filaments include all linear, flexible constructs which have a very small cross-sectional area with respect to their length. A filament can inter alia be a monofilament or a strand of plastics material, which are formed as a single thread and can be produced for example by means of an extrusion melt spinning method from single-jet nozzles. A diameter of a filament can be between a few nanometers and a few millimeters, wherein larger diameters are also conceivable, depending on the use and material of the filament. A filament can consist of different materials or of material combinations, wherein it is possible for a plastics material or a metal to be a suitable material for many uses.

The heated heating fluid can be suitable liquids or gases. It has been found that previously heated hot air is advantageously suitable for being conveyed together with the filament, through the channel portions, and in the process for heating the filament. In the case of typically long-lasting operating, the heated heating fluid also heats the channel portions and surrounding wall regions, as a result of which the desired heating of the filament is additionally assisted.

According to a particularly advantageous embodiment, it is provided for the filament emerging from the second channel portion to be deformed, using a deformation apparatus, before being wound onto the winding mandrel. According thereto, the deformation does not take place before or during the conveying of the filament through the channel portions of the rotating rotation body, but rather only thereafter. The deformation of the filament into the cross-sectional area provided for the helical coil takes place after a comparatively long heating period of the filament, directly before winding onto the winding mandrel. Double heating of the filament, known occasionally from practice, in order to first deform the filament cross-section before the filament is conveyed through the channel portions, and to subsequently again assist the winding onto the winding mandrel, is not required.

In view of a winding of the filament onto the winding mandrel that is as disruption-free and quick as possible, according to one embodiment it is advantageous for the filament to be fed to the first channel portion having a rotationally symmetric cross-sectional area, and for the filament to be deformed in the deformation apparatus to a non-rotationally symmetric cross-sectional area.

In order to convey the heated heating fluid in or through the channel portions, it is optionally provided for the filament to be conveyed through a non-rotatably arranged feed chamber, before the first channel portion, and to be fed to the first channel portion, and for the heated heating fluid to likewise be fed to the first channel portion, via the feed chamber. The feed chamber, which is arranged so as to be non-rotatable, can be used to easily establish a connection to an externally arranged storage container for the heating fluid. The heating fluid can optionally be appropriately conditioned inside or outside the feed chamber, or brought to the desired temperature, and an excess pressure can be applied thereto, in order to bring about the desired heating of the filament in the channel portions during the subsequent flow through the channel portions.

In order to be able to advantageously also use the heated heating fluid, after it has flowed through the two channel portions, in a purposeful manner for use when deforming the cross-sectional area of the filament, it is optionally provided for the heated heating fluid to flow through the deformation apparatus, after flowing out of the second channel portion.

In order to facilitate the filament, heated while being conveyed through the channel portions, retaining its deformation, enforced by winding onto the winding mandrel, and the stabilization of the shaping of the helical coil as a result, according to an embodiment it is provided for the heated heating fluid flowing out of the second channel portion to be directed towards the winding mandrel. The winding mandrel is advantageously additionally heated as a result.

The disclosure also relates to a device for producing helical coils, in particular for coil screens, comprising a core element which is mounted in a non-rotatable manner, comprising a first rotation body which is mounted so as to rotate about a first portion of the core element which extends along the core element in a filament conveying direction, and comprising a second rotation body which is mounted so as to rotate about a second portion of the core element which extends along the core element in the filament conveying direction and is downstream of the first portion, and comprising a winding mandrel which protrudes out of the core element after the second portion, in the filament conveying direction, wherein a filament is guided, in the filament conveying direction, through a first channel portion in the rotating first rotation body and subsequently through a second channel portion in the synchronously rotating second rotation body, and subsequently wound around the winding mandrel, such that a helical coil can be produced from the filament by a continuous feed of the windings of the filament wound around the winding mandrel.

Devices known from the prior art are described for example in DE 10 2010 056 254 A1 or in. The arrangement, described in DE 20 2008 005 836 U1, of two rotation bodies on a common core element, wherein the axes of rotation of the two rotation bodies have a lateral offset from one another, makes it possible that the filament can be conveyed through the rotating channel portions and wound onto a stationary winding mandrel that protrudes beyond the rotating channel portions, from which mandrel the wound windings can subsequently be removed or pushed away without further deformation of the windings.

The early deformation of the filament before entry into the first channel portion is perceived as disadvantageous. Heating of the filament in order to assist the winding onto the winding mandrel can be achieved only by means of a heating apparatus that is arranged upstream in the conveying direction.

It is therefore considered to be an object of the present disclosure to develop a device of this kind for producing helical coils in such a way that advantageous heating of the filament before winding thereof onto the winding mandrel is made possible.

This object is achieved in that a non-rotatably mounted feed chamber is arranged in front of the first rotation body, in the filament conveying direction, through which feed chamber the filament supplied from a store can be introduced into the first channel portion. The feed chamber is connected to a heating fluid supply such that a heated heating fluid can be fed with excess pressure to the feed chamber, and can subsequently flow through the first channel portion and the second channel portion, arranged downstream. The feed chamber is arranged so as to be non-rotatable and can easily be connected to a heating fluid supply by means of connection lines. The heating of the heating fluid can take place either inside the feed chamber or preferably outside, such that the heating fluid flowing into the feed chamber is already heated. The feed chamber can comprise an annular outlet gap which is arranged and designed such that an inlet of the first channel portion of the first rotation body moves along the annular outlet gap during operation, and the heating fluid to which an excess pressure is applied is pushed continuously into the first channel portion. In order to design the device so as to be as space-saving as possible and so as to have a low weight, it is advantageous for the heating of and the application of pressure to the heating fluid to be carried out using external components, outside of the feed chamber.

According to a particularly advantageous embodiment, it is provided for a deformation apparatus to be arranged on the second rotation body, following an outlet of the second channel portion in the filament conveying direction, by means of which deformation apparatus the heated filament emerging at the outlet of the second channel portion can be deformed before being wound onto the winding mandrel. According thereto, the deformation of the filament takes place immediately before the filament, then already deformed, is wound onto the winding mandrel. The filament can first be fed, having a rotationally symmetric shaping or having a circular cross-sectional area of the first channel portion, to the first channel portion, and conveyed through the rotating first and second channel portion, which prevents the filament from tilting during the rotational movement or from being able to jam while being conveyed through the channel portions. In this way, it is possible to achieve significantly higher rotational speeds for the rotational movement of the filament, and to allow for a correspondingly higher production speed for the helical coil.

Furthermore, on account of the deformation apparatus being arranged following the outlet of the second channel portion, it is possible to use the entire conveying length of the filament through the first and second channel portion for heating the filament prior to subsequent deformation using the deformation apparatus. This allows for particularly gentle and uniform heating of the filament, which is in turn advantageous for the production speed and the mechanical stability of the helical coil produced in this way.

In order to also be able to use the heating power of the heating fluid flowing through the two channel portions for the deformation apparatus, it is optionally possible for the deformation apparatus to comprise an inflow opening for the heated heating fluid which faces the outlet of the second channel portion, and for the deformation apparatus to comprise an outflow opening for the heated heating fluid. In this way, the heated heating fluid can also flow through the deformation apparatus, and in the process heat both the filament conveyed through the deformation apparatus, and the surrounding components of the deformation apparatus.

In order to be able to additionally use the heated heating fluid for advantageous heating of the filament during winding onto the winding mandrel, it is provided for the outflow opening of the deformation apparatus to be directed towards the winding mandrel. As a result, the heating fluid flowing out of the deformation apparatus heats both the winding mandrel and the filament wound onto the winding mandrel. As a result, the thermal energy transported by the heating fluid is used very efficiently for heating a plurality of components of the device along the filament conveying direction.

According to an advantageous embodiment it is provided for the core element to comprise a first shaft in the first portion, about which shaft the first rotation body is rotatably mounted, for the core element to comprise a second shaft in the second portion, about which shaft the second rotation body is rotatably mounted, and for the first shaft to be connected to the second shaft, by means of a connection device, such that a central axis of the first shaft has a lateral offset relative to a central axis of the second shaft. The two rotation bodies can be driven from outside and caused to rotate during the operation of the device. On account of the offset central axes of the two shafts, on which the associated rotation body is rotatably mounted in each case, the core element arranged on the inside cannot rotate therewith. As a result, a non-rotatable or stationary arrangement of the core element can be achieved, without a rigid connection of the core element to the surroundings being required. The filament rotating about the core element can then be guided and conveyed around the core element, along the core element, in a simple manner. The winding mandrel can be fixed to the stationary core element and be designed so as to protrude in the filament conveying direction.

In order to reduce an undesired loss of thermal energy and of the heated heating fluid, a spacing between an outlet of the first channel portion of the first rotation body and an inlet of the second channel portion of the second rotation body is less than 1 mm, preferably less than 0.5 mm, and particularly preferably less than 0.2 mm. The two rotation bodies each rotate about axes of rotation which are arranged so as to be laterally offset relative to one another, and which correspond to the laterally offset central axes of the two shafts on which the two rotation bodies are mounted. A rigid coupling or a continuous connection along the periphery of the two rotation bodies is therefore not readily possible. Specifying a gap width of a gap between the two rotation bodies so as to be as small as possible makes it possible for the heating fluid, flowing through the first channel portion, to be substantially completely transferred into the second channel portion, adjoining after the gap, or to flow into said channel portion, and for an undesired lateral outflow of the heating fluid through the gap formed between the two rotation bodies to be largely prevented. An inlet opening of the second channel portion which faces the first channel portion can expediently have a larger diameter, and the second channel portion can subsequently taper to the specified channel diameter, such that the filament emerging from the first channel portion can be threaded into the adjoining second channel portion simply by means of feeding of the filament into the first channel portion, without the need for separate support or forced guidance at the inlet of the second channel portion.

It is not necessary for the two rotation bodies to be driven, so as to perform the relevant rotational movement, independently of one another by associated drive means or drive components in each case. It has been found that, in particular in the case of high rotational speeds, a necessary synchronous rotational movement of the two rotation bodies is associated with a significant control effort, and the relevant drive devices have to be designed very precisely and controlled in a laborious manner. According to an advantageous embodiment it is therefore provided for the rotatably mounted first rotation body and the rotatably mounted second rotation body to be coupled together in a contactless manner by means of a magnetic coupling. Specifically in connection with as small as possible a gap width between the first and the second rotation body, a magnetic coupling can be implemented which couples the rotation body, not separately driven, to the driven rotation body, and transfers the rotational movement thereof to the non-driven rotation body. The two rotation bodies are thereby prevented, in a simple manner, from drifting apart.

An embodiment, by way of example, of the inventive concept is shown in the following, in various drawings, and explained in greater detail.

DETAILED DESCRIPTION

FIGS. 1 to 4 show various views of a device 1 for producing a helical coil 2 from a filament 4 fed to the device 1 by a supply roll 3. The filament 4 is fed to a first rotation body 7 via a feed chamber 6 which is non-rotatably fixed to a base 5 or to a substrate, in which first rotation body a first channel portion 8 is formed, through which the filament 4 is conveyed. The filament 4 is subsequently conveyed through a second channel portion 9 which is formed in a second rotation body 10. The first rotation body 7 and the second rotation body 10 are rotatably arranged on a core element 11 (merely indicated in FIG. 1) which is in turn non-rotatably mounted in the two rotation bodies 7, 10.

Figure 1:
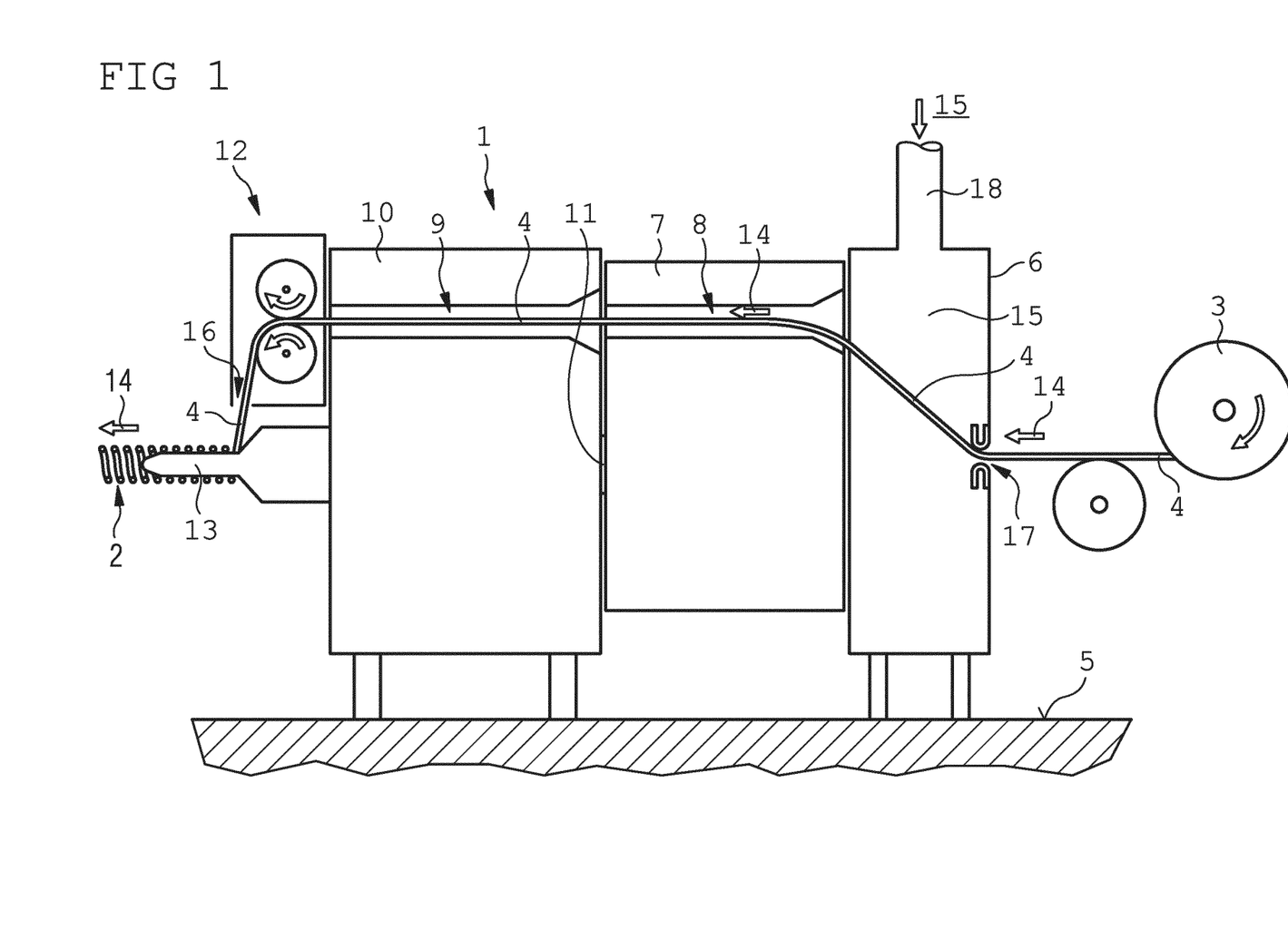
FIG. 1 is a schematic view of a device for producing a helical coil.
Figure 3:
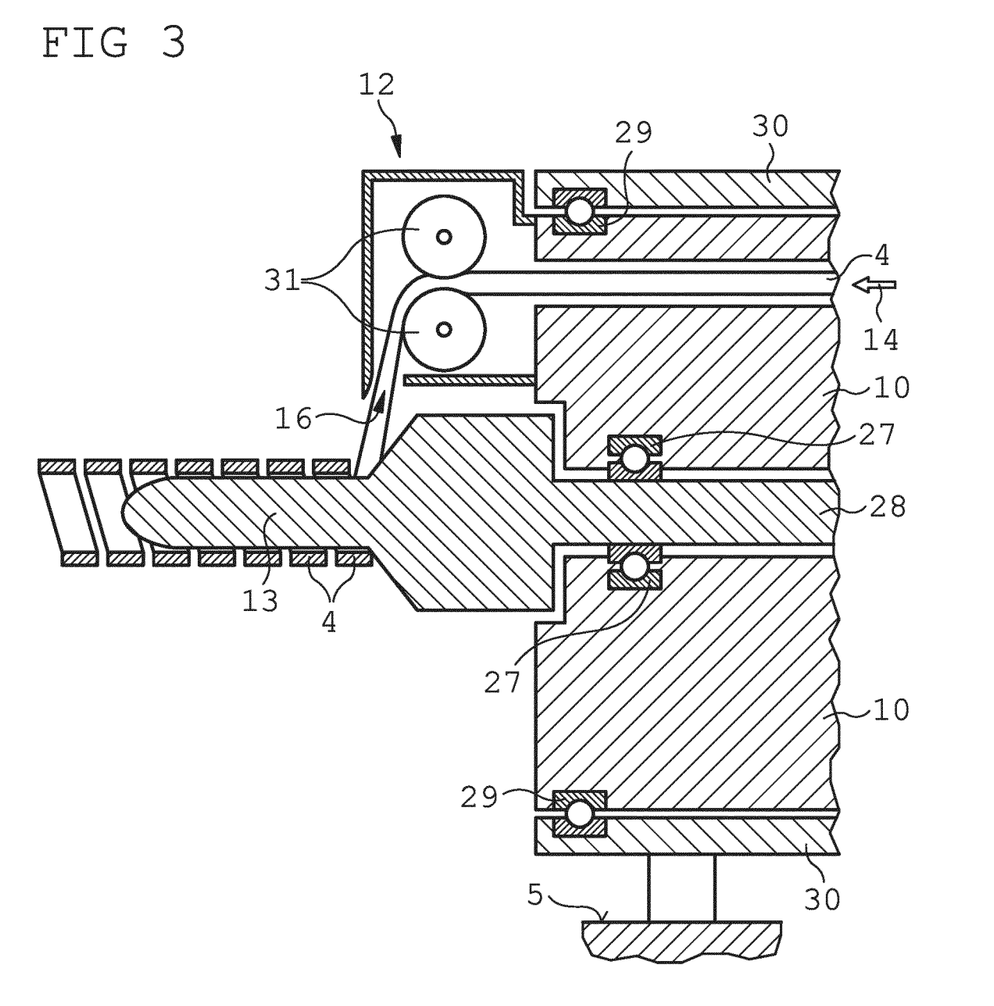
FIG. 3 is a cross section of a deformation apparatus, by means of which the filament emerging from a second rotation body is deformed, before the deformed filament is wound onto a winding mandrel.

A deformation apparatus 12 is fastened at an end of the second rotation body 10 remote from the first rotation body 7, by means of which deformation apparatus a cross-sectional area of the filament 4 conveyed through the deformation apparatus 12 is deformed from an initially still rotationally symmetric or circular cross-sectional area into an elliptical or approximately rectangular cross-sectional area.

Subsequently, the deformed filament 4 is wound from the rotating second rotation body onto a non-rotatably arranged winding mandrel 13 which is fixed on the core element 11 and protrudes beyond the core element 11 in a filament conveying direction indicated by arrows 14. Winding a new winding onto the winding mandrel 13 dislodges already wound windings, and the helical coil 2 produced in this way is pushed further in the filament conveying direction and pushed off the winding mandrel 13.

Figure 2:
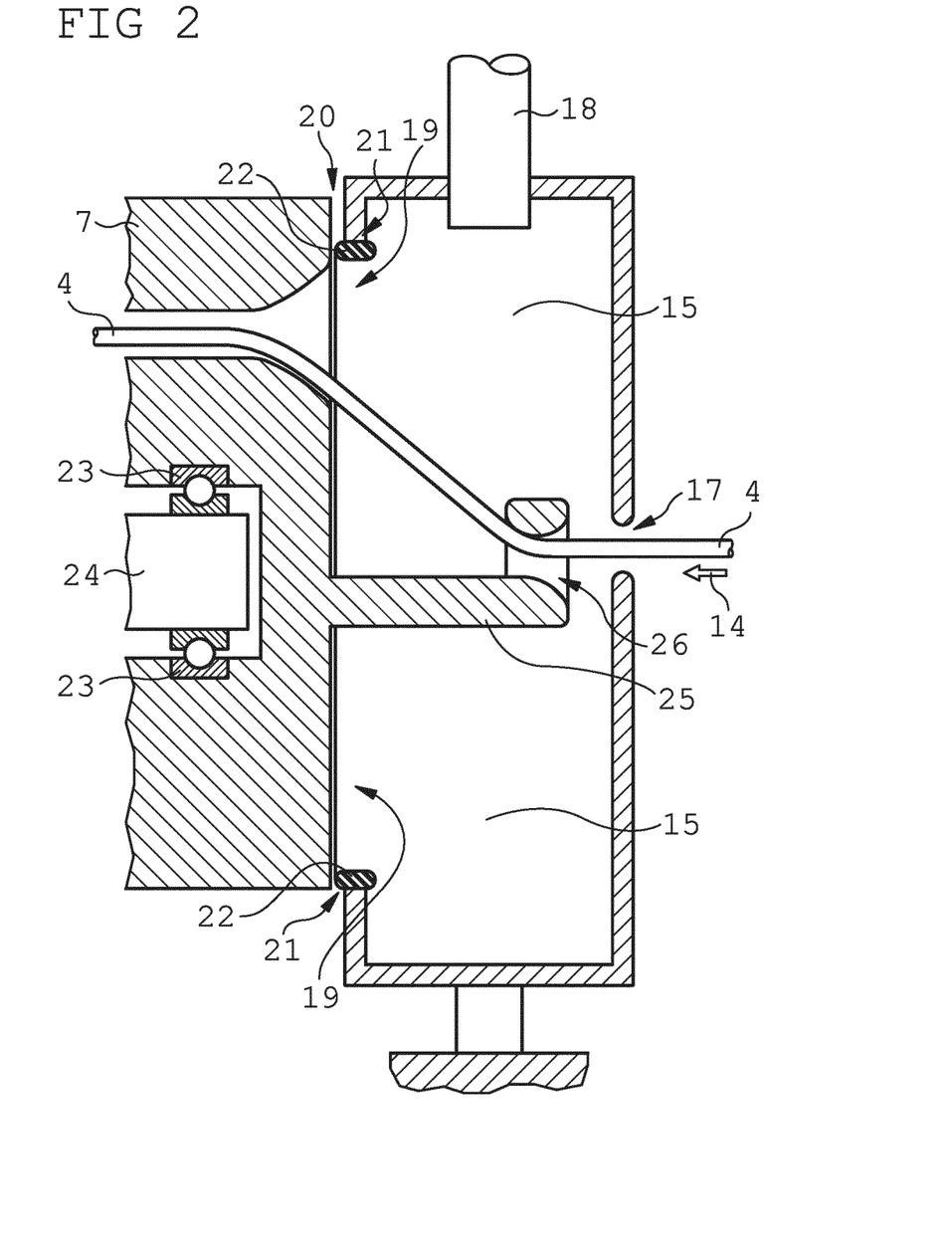
FIG. 2 is a cross section of feed chamber through which both a filament and a heating fluid is fed to a rotation body which is arranged downstream in the filament conveying direction and comprises a first channel portion.

A heated heating fluid 15, to which an excess pressure is applied, is fed to the feed chamber 6 from a heating fluid supply container (not shown in the drawings). The heating fluid to which an excess pressure is applied flows out of the feed chamber 6 into the first channel portion 8, and subsequently through the first channel portion 8 and the adjacently extending second channel portion 9, as far as into the deformation apparatus 12. From the deformation apparatus 12, the heating fluid emerging through an outlet opening 16 is directed towards the winding mandrel 13 and, when flowing out of the deformation apparatus 12, also heats the winding mandrel 13 and the filament 4 wound thereon.

While being conveyed through the first channel portion 8 and through the second channel portion 9, as well as during the deformation in the deformation apparatus 12 and during winding onto the winding mandrel 13, the filament 4 is heated by the heated heating fluid 15, starting with the feed chamber 6. This brings about gentle and uniform heating of the filament 4, which is advantageous for the deformation of the filament 4 in the deformation apparatus 12 and when winding onto the winding mandrel 13, and results in the helical coil 2, produced in this way, having a stable and mechanically resilient shaping.

The feed chamber 6, shown enlarged in FIG. 2, comprises an inlet opening 17 for the filament 4 fed from the supply roll 3. The heating fluid 15, which is previously heated and is subjected to an excess pressure, is supplied via a laterally arranged connection line 18. Hot air is an appropriate heating fluid 15 for a plurality of fields of application and filament materials. On a side facing the first rotation body 7, the feed chamber 6 comprises a circular outlet opening 19. The first rotation body 7 is spaced apart from the circular outlet opening 19 of the feed chamber 6 merely by a narrow gap 20. An opening edge 21 of the outlet opening 19 comprises sealing elements 22 which seal a transition between the outlet opening 19 and the first channel portion 8, formed in the first rotation body 7, with respect to the surrounding gap 20.

The first rotation body 7 is rotatably mounted on a first shaft 24 of the non-rotatably arranged core element 11 by means of a ball bearing 23. A guide arm 25 which comprises a guide lug 26 and protrudes into the feed chamber 6 through the outlet opening 19 is arranged on the first rotation body 7, which arm brings about additional guidance, during the rotational movement of the first rotation body 7, for the filament 4 which is guided along therewith, in a rotating manner, in the first channel portion.

A partial region of the device 1, around the winding mandrel 13, is shown enlarged in FIG. 3. The second rotation body 10 is rotatably mounted on a second shaft 28 of the core element 11 by means of ball bearings 27. The second rotation body 10 is likewise rotatably mounted in a housing 30, rigidly connected to the base 5, by means of ball bearings 29.

The deformation apparatus 12 is rigidly connected to the second rotation body 10. The filament 4 emerging out of the second channel portion 9 is conveyed through two rollers 31, which can be fixed at a specifiable spacing relative to one another, and is deformed in the process. In the process, the filament 4 which is initially still rotationally symmetric and has a circular cross-sectional area is deformed into a filament 4 having an approximately rectangular cross-sectional area, which is advantageous for a plurality of intended uses of the helical coil 2.

After emerging from the outlet opening 16, the deformed filament 4 is continuously wound around the winding mandrel 13 on account of the rotational movement of the rotating second rotation body 10 and the deformation apparatus 12 fixed thereon, such that new windings of the filament 4 are always wound onto the winding mandrel 13, and in each case a new winding dislodges the preceding windings already wound on. As a result, the helical coil 2 produced in this way is continuously pushed over the winding mandrel 13 in the filament conveying direction, and is finally pushed down from the winding mandrel 13 after the end of the winding mandrel 13.

Figure 4:
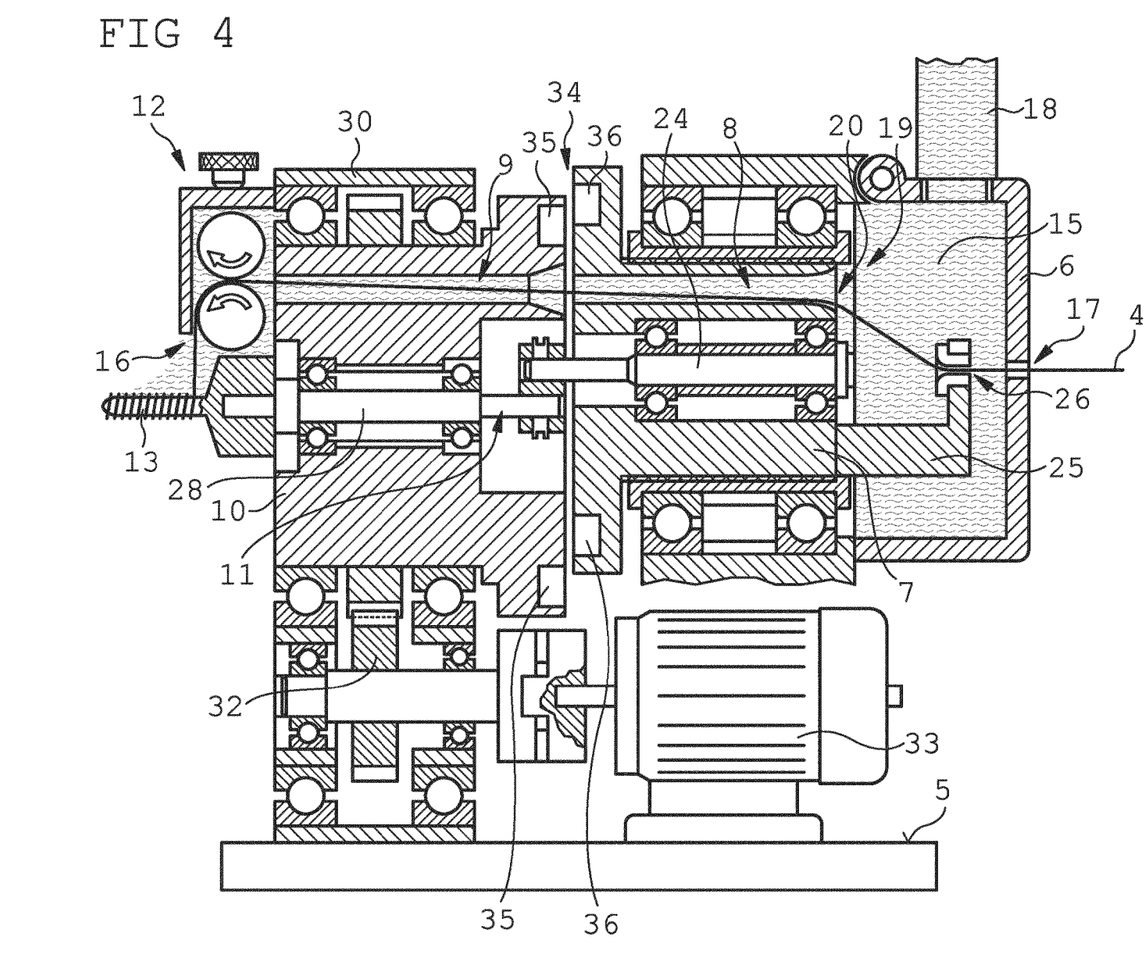
FIG. 4 is a schematic cross section of an embodiment by way of example of the device.

A schematic cross section of the device 1 is shown in FIG. 4. The second rotation body 10 is driven by an electric motor 33, via a gear drive 32, and set into a rotational movement. The second rotation body 10 is rotatably mounted, inside the housing 30, on the second shaft 28 of the core element 11. The first rotation body 7 is likewise rotatably mounted on the first shaft 24 of the core element 11. The first shaft 24 and the second shaft 28 of the core element 11 have a lateral offset with respect to one another. This lateral offset, shown very large in FIG. 4 for the purpose of clarity, can in practice be a few millimetres or less, and serves to prevent a rotational movement of the therefore non-rotationally symmetric core element 11 inside the rotating rotation bodies 7, 10.

A gap 34 having a small gap width of less than 1 mm is formed between the first rotation body 7 and the second rotation body 10. Both the first rotation body 7 and the second rotation body 10 each comprise magnet elements 35, 36 on an end face facing the gap, in each case. The mutually facing magnet elements 35, 36 bring about a magnetic coupling of the first rotation body 7, which is not separately driven, to the second rotation body 10 that is driven by the electric motor 33, and result in the first rotation body 7 being drawn along together with the second rotation body 10 and being caused to perform a synchronous rotational movement.

The invention claimed is:

1. A device (1) for producing helical coils, comprising:
   a core element (11) which is mounted in a non-rotatable manner;
   a first rotation body (7) which is mounted so as to rotate about a first portion of the core element (11) which extends along the core element (11) in a filament conveying direction;
   a second rotation body (10) which is mounted so as to rotate about a second portion of the core element (11) which extends along the core element (11) in the filament conveying direction and is downstream of the first portion; and
   a winding mandrel (13) which protrudes out of the core element (11) after the second portion, in the filament conveying direction, wherein a filament (4) can be
guided, in the filament conveying direction,
through a first channel portion (8) in the rotating first rotation body (7) and
subsequently through a second channel portion (9) in the synchronously rotating second rotation body (10), and
subsequently wound around the winding mandrel (13), such that a helical coil (2) is produced from the filament (4) by a continuous feed of the windings of the filament (4) wound around the winding mandrel (13),
wherein a non-rotatably mounted feed chamber (6) is arranged in front of the first rotation body (7) in the filament conveying direction, through which feed chamber the filament (4) supplied from a store can be introduced into the first channel portion (8),
wherein the feed chamber (6) is connected to a heating fluid supply, such that a heated heating fluid (15) can be fed with excess pressure to the feed chamber (6) and can subsequently flow through the first channel portion (8) and the second channel portion (9), arranged downstream,
wherein the core element (11) comprises a first shaft (24) in the first portion, about which shaft the first rotation body (7) is rotatably mounted,
wherein the core element (11) comprises a second shaft (28) in the second portion, about which shaft the second rotation body (10) is rotatably mounted, and
wherein the first shaft (24) is connected to the second shaft (28), by a connection device, such that a central axis of the first shaft (24) has a lateral offset relative to a central axis of the second shaft (28).

2. The device (1) according to claim 1,
wherein a deformation apparatus (12) is arranged on the second rotation body (10), following an outlet of the second channel portion (9) in the filament conveying direction, by which deformation apparatus the heated filament (4) emerging at the outlet of the second channel portion (9) can be deformed before being wound onto the winding mandrel (13).

3. The device (1) according to claim 2,
wherein the deformation apparatus (12) comprises an inflow opening for the heated heating fluid (15) which faces the outlet of the second channel portion (9), and
wherein the deformation apparatus (12) comprises an outflow opening (16) for the heated heating fluid (15).

4. The device (1) according to claim 3,
wherein the outflow opening (16) of the deformation apparatus (12) is directed towards the winding mandrel (13).

5. The device (1) according to claim 1,
wherein a spacing between an outlet of the first channel portion (8) of the first rotation body (7) and an inlet of the second channel portion (9) of the second rotation body (10) is less than 0.2 mm.

6. The device (1) according to claim 1,
wherein the rotatably mounted first rotation body (7) and the rotatably mounted second rotation body (10) are coupled together in a contactless manner by a magnetic coupling.

* * * * *